United States Patent [19]

Drouillard

[11] 4,375,905
[45] Mar. 8, 1983

[54] MANUALLY OPERATED BUCKET SEAT ADJUSTER

[75] Inventor: James R. Drouillard, Rochester, Mich.

[73] Assignee: General Motors Corporation, Detroit, Mich.

[21] Appl. No.: 318,133

[22] Filed: Nov. 4, 1981

[51] Int. Cl.³ ............................................. F16C 29/04
[52] U.S. Cl. .................................... 308/6 R; 308/3.8
[58] Field of Search .............. 308/6 R, 3.8, 3.6, 3 R; 312/350, 341 R

[56] References Cited

U.S. PATENT DOCUMENTS

| | | | |
|---|---|---|---|
| 2,970,015 | 1/1961 | Ragsdale | 308/6 |
| 3,171,698 | 3/1965 | Campbell | 308/3.8 |
| 3,350,046 | 10/1967 | Kirk | 248/430 |
| 3,393,019 | 7/1968 | Fraser et al. | 308/3.6 |
| 4,199,200 | 4/1980 | Livingston | 308/3.8 |
| 4,291,929 | 9/1981 | Faust | 308/3.5 |

*Primary Examiner*—Lenard A. Footland
*Attorney, Agent, or Firm*—Herbert Furman

[57] ABSTRACT

A seat slide bearing assembly includes a bearing unit of low friction plastic material and a roller. The bearing unit includes an apertured body portion which rotatably receives the roller and includes an integral tab fitting within an aperture of the roller to preassemble the bearing unit and roller as a module. Integral legs extend from the body portion and terminate in integral bearing portions having opposed faces, one of which is provided with a series of deflectable ribs.

3 Claims, 3 Drawing Figures

MANUALLY OPERATED BUCKET SEAT ADJUSTER

This invention relates to seat slides and more particularly to a bearing assembly for a seat slide.

The bearing assembly of this invention is particularly intended for use with seat slides which include a pair of generally U-shaped track members located in opposed relationship to each other and having opposed spaced base portions and pairs of opposed spaced terminal flanges.

In the preferred embodiment, the bearing assembly includes a bearing unit of low friction plastic material and a roller. The bearing unit includes a generally planar body portion which fits between the base portions of the track members. The body portion is provided with an elongated aperture which freely rotatably receives the roller. The roller engages the base portions of the track members to space these base portions and the pairs of terminal flanges with respect to each other and support one of the track members on the other for movement relative thereto. In order to preassemble the bearing unit and roller as a module, a deflectable tab of the body portion fits within an axial aperture of the roller. Integral legs extend from spaced sides of the body portion and each leg terminates in an integral bearing portion which fits between a respective pair of opposed spaced terminal flanges to slidably support the flanges of the one member on the other for relative movement. Each bearing portion includes a plurality of deflectable ribs which engage the other terminal flanges to takeup variance in the spacing of the pairs of terminal flanges which occurs due to the variance in spacing of these flanges by the roller.

A primary feature of this invention is that it provides a bearing assembly which includes a bearing unit having a body portion and spaced bearing portions which can be preassembled with a roller as a module prior to assembly of the bearing assembly with a seat slide which includes a pair of generally U-shaped track members located in opposed relationship to each other and having opposed spaced base portions and pairs of opposed spaced terminal flanges. Another feature is that the bearing unit is formed of low friction plastic material and includes a body portion which receives and is rotatably secured to the roller and a pair of bearing portions, each of which fits between a pair of opposed spaced terminal flanges of the track members to slidably support these flanges for movement relative to each other, with each bearing portion further including a deflectable rib portion to takeup variance in the spacing of the pairs of flanges by the roller.

These and other features will be readily apparent from the following specification and drawings wherein.

Figure 1:
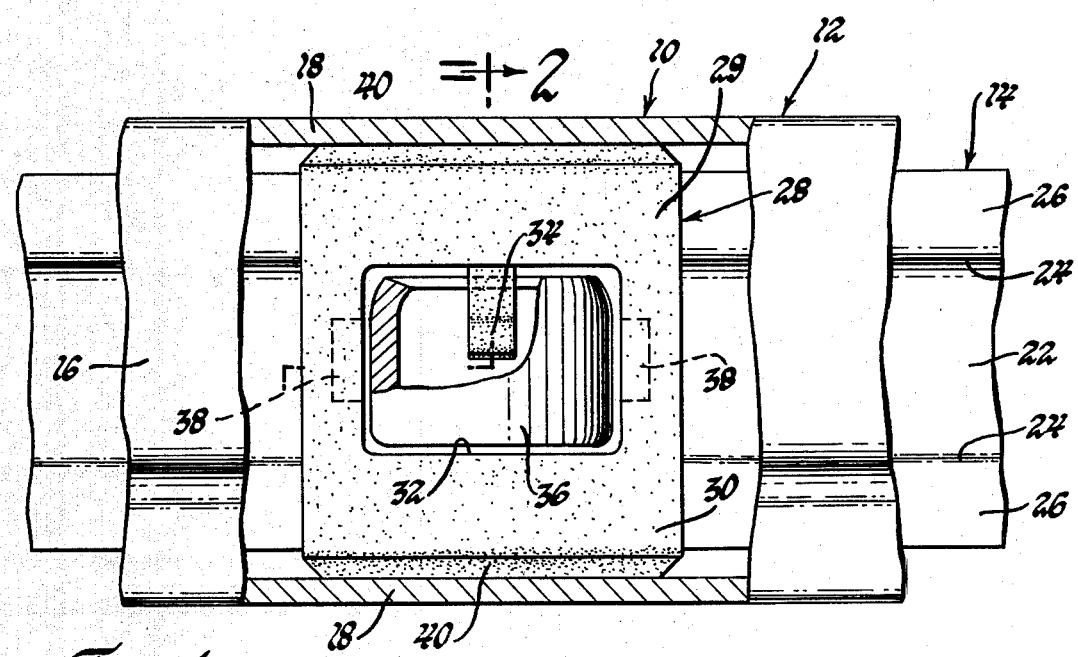
FIG. 1 is a partially broken-away partial plan view of a seat slide embodying a bearing assembly according to this invention.
Figure 2:
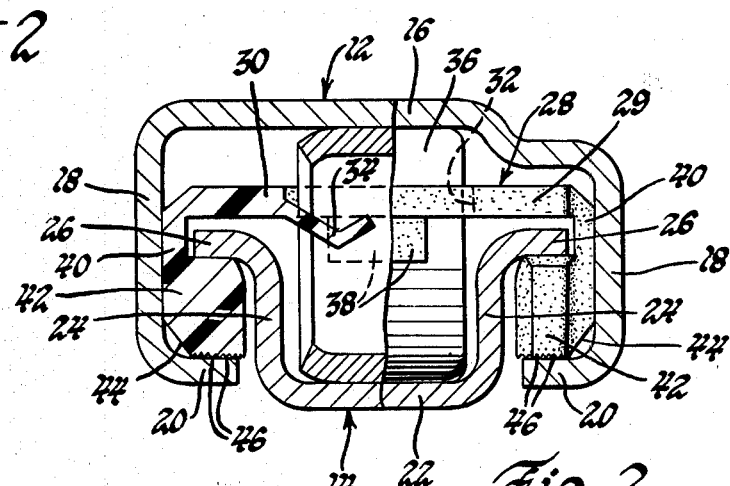
FIG. 2 is a partially broken away sectional view taken generally along the plane indicated by line 2—2 of FIG. 1.

Referring now to FIGS. 1 and 2, a seat slide includes an upper track member 12 and a lower track member 14 which are of generally U-shaped cross-section and are located in opposed relationship to each other. The upper track member 12 includes a base portion 16, a pair of integral side edge portions 18 and a terminal flange 20 integral with each side edge portion and extending inwardly therefrom. The lower track member 14 includes a base portion 22 located in opposed spaced relationship to the base portion 16, a pair of side edge portions 24, each located in opposed spaced relationship to a respective side edge portion 18. Each side edge portion 24 include an outwardly extending terminal flange 26 located in opposed spaced relationship to a respective flange 20. The seat slide 10 is conventional and widely used in the automotive industry.

Figure 3:
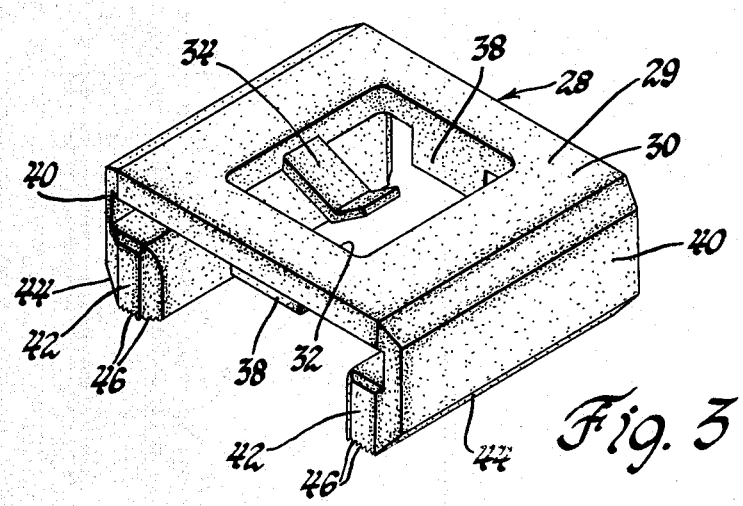
FIG. 3 is a perspective view of the bearing unit.

The bearing assembly 28 according to this invention includes a bearing unit 29 of low friction plastic material and having a planar body portion 30 which fits between base portions 16 and 22 and is provided with an elongated central aperture 32. An angular integral deflectable tang 34 extends inwardly from one of the side edges of the aperture 32. A hollow roller 36 is freely rotatably received within the aperture 32 and the tang 34 is received within the roller to provide for preassembly of the roller and the bearing unit as a module. An integral lateral tab 38 extends laterally from body portion 30 at each end edge of aperture 32 to ensure rolling of roller 36 relative to the bearing unit. As best shown in FIG. 3, an integral leg 40 extends laterally from each side edge portion 18 of the body portion 30, with the legs 40 being spaced generally the same as the spacing of the edge portions 18 of track member 12. Each leg terminates in an integral elongated bearing portion 42 which is received between a respective pair of opposed terminal flanges 20 and 26 of the track members 12 and 14. An elongated edge 44 of each bearing portion is chamfered to insure fitting of the bearing portions without interference with respect to the junction between the flanges 20 and edge portions 18. Each bearing portion further includes a series of integral elongated ribs 46 along one side thereof which engage the flanges 20 of the upper track member 12.

The roller 36 spaces the base portions 16 and 22 with respect to each other and also spaces the pairs of terminal flanges 20 and 26 with respect to each other while mounting the track member 12 on the track member 14. Due to production tolerances, the pairs of flanges 20 and 26 may be spaced varying distances from each other. The ribs 46 may be deflected if necessary to insure that the bearing portions 42 tightly but slidably engage the respective pairs of flanges 20 and 26 to insure ease to linear movement without chucking between the track members 12 and 14.

Thus this invention provides an improved bearing assembly for a seat slide.

The embodiments of the invention in which an exclusive property or privilege is claimed are defined as follows:

1. In a seat slide including a pair of generally U-shaped track members, one including a base portion, a pair of laterally extending side edge portions and a terminal flange extending inwardly from each of the side edge portions, the other track member being encompassed within the one track member and including a base portion in opposed spaced relationship to the one base portion, a pair of side edge portions, each located in opposed spaced relationship to a respective side edge portion of the one track member, and a terminal flange extending outwardly from each of the side edge portions and located in opposed spaced relationship to a respective terminal flange of the one track member, a bearing assembly for the track members comprising, a bearing unit of low friction plastic material including an apertured body portion received between the base portions of the track members, a roller received in the aperture of the body portion and rotatably engaging the opposed base portions of the track members to space the base portions and pairs of terminal flanges relative to each other and support the one track member on the other track member, means releasably interconnecting the roller and the body portion to permit preassembly of the roller with the bearing unit, an integral leg extending from the body portion intermediate each opposed pair of respective side edge portions and terminating in an integral bearing portion received between a pair of opposed respective terminal flanges to slidably support the one terminal flange on the other, each bearing portion including at least one deflectable rib engageable with a terminal flange of each pair to takeup variance in the spacing of the pairs of terminal flanges by the roller.

2. A bearing assembly for track members comprising, a bearing unit of low friction plastic material including a body portion having an elongated aperture, a roller rotatably received in the aperture of the body portion and including an axial aperture, means on the body portion receives in the roller aperture to releasably interconnect the roller and the bearing unit as a module, an integral leg extending from opposite edges of the body portion and terminating in an integral elongated bearing portion, and at least one integral deflectable rib on each bearing portion.

3. A bearing assembly for track members comprising, a bearing unit of low friction plastic material including a body portion having an elongated aperture, a roller rotatably received in the aperture of the body portion and including an axial aperture, an integral tab of the body portion extending into the axial aperture of the roller to releasably interconnect the roller and the bearing unit as a module, an integral leg extending from opposite edges of the body portion and terminating in an integral elongated bearing portion having spaced bearing faces, and a plurality of deflectable ribs on respective bearing faces of each bearing portion.

* * * * *